Sept. 4, 1945.  E. H. KRUSE  2,384,101
BAIT CAN AND FISH SACK HOLDER
Filed Jan. 31, 1944
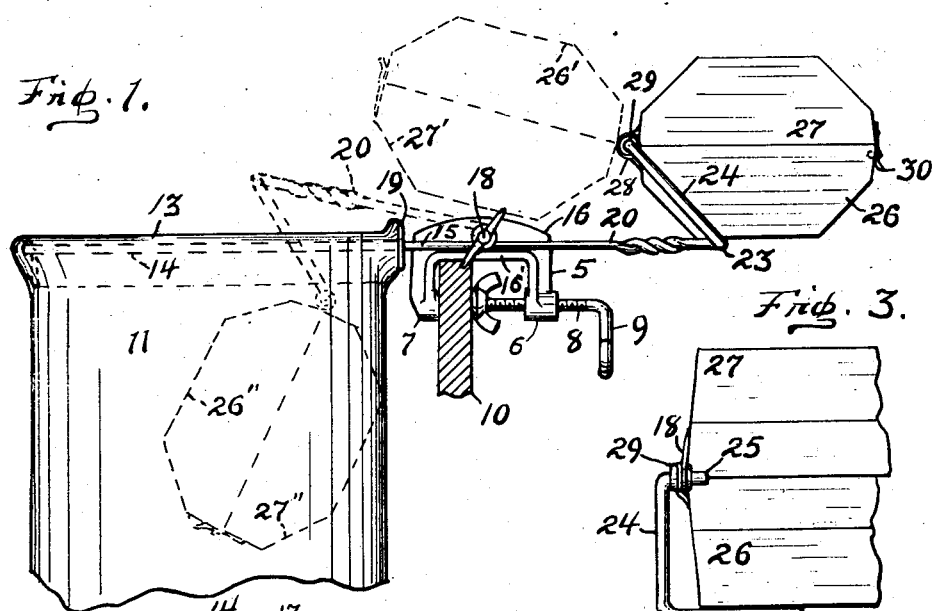
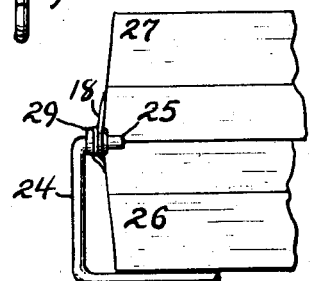
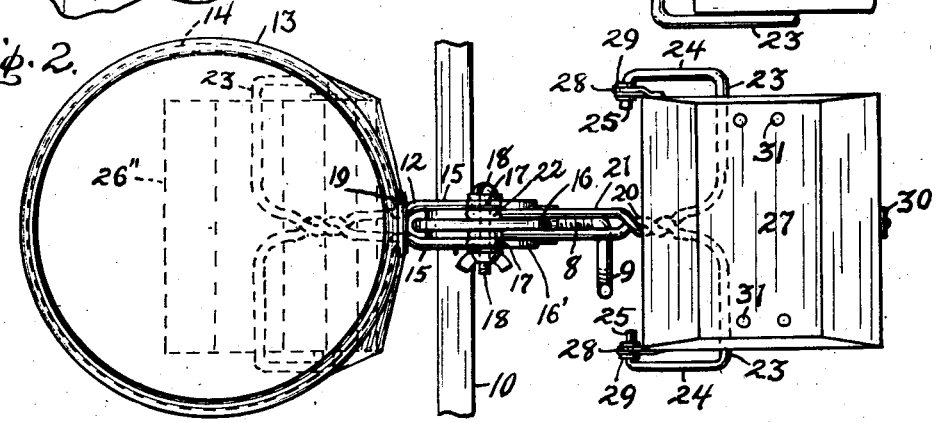
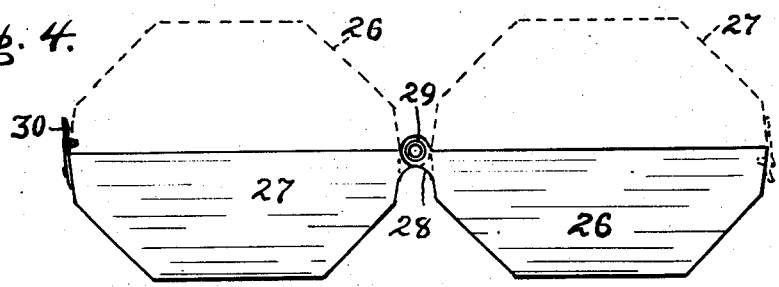
Edward H. Kruse INVENTOR.
BY *N. G. Burns* atty.

Patented Sept. 4, 1945

2,384,101

UNITED STATES PATENT OFFICE 2,384,101

BAIT CAN AND FISH SACK HOLDER

Edward H. Kruse, Fort Wayne, Ind.

Application January 31, 1944, Serial No. 520,387

11 Claims. (Cl. 43—55)

This invention relates to improvements in a bait can and fish sack holder adapted to be detachably secured to the gunwale of a boat or other support therefor.

An object of the invention is to provide a bait can constituted of a pair of trays hinged together in such fashion that either of said trays is selectively operable as a cover for the other tray when the can is closed, or the trays function jointly as an open bait container when in extended position.

Another object of the invention is to provide a bait can and a mount therefor including a clamp detachably secured to a gunwale or other support, provided with a swing arm hingedly connected with said clamp and the bait can wherefore to permit inversion of the can and movement thereof into selected positions.

And a further object of the invention is to afford an apparatus having a clamp for attachment to a gunwale or other support therefor, a fish sack having supported connection with the clamp, and a bait can provided with a swing frame connected hingedly with said clamp and can, the arrangement being such as to permit the can to be moved selectively into the sack or into exterior selected positions.

Other objects and advantages of the invention appear in the following description.

An illustrative embodiment of the invention is shown in the accompanying drawing, in which:

Fig. 1 is a side elevational view of a structure in which the invention is incorporated, a portion being in section, and the lower portion of the fish sack being omitted;

Fig. 2 is a top plan view of the structure shown in Fig. 1;

Fig. 3 is a fragmentary front elevational view of the bait can and its swing frame; and Fig. 4 is a side elevational view of the bait can shown in open position, Figs. 3 and 4 being drawn to an increased scale.

The illustrative embodiment of the invention consists of a clamp 5 provided with jaws 6—7 spaced apart and a clamp screw 8 threaded in one of said jaws 6 provided with an operating handle 9 for securing the clamp detachably on a gunwale 10 of a boat or other support.

A fish sack 11 preferably formed of fabric or other suitable material is provided which is supported on a frame 12 that is hingedly connected with the clamp 5. The top of the sack is open and has a surrounding hem 13 and the frame has a circular loop 14 that is located within the hem and is provided with outwardly extending arms 15, disposed astride of a rib 16 on the back of the clamp 5, that terminate with alined eyes 17, there being a bolt 18 that extends through the eyes and the rib which affords hinged support for the frame on the clamp. The clamp has lateral sides 16' that underlie the arms 15 when the frame is in operating position and limit the hinge movement of the frame. The arms 15 are contiguous with the loop 14 and protrude through a grommet 19 provided on the sack for their accommodation.

A swinging bracket 20 preferably formed of wire, shaped to have parallel arms 21 and alined eyes 22, is disposed on the bolt 18 astride of the rib 16 between the eyes 17 on the sack frame, so that said bracket has hinge movement on the clamp. The lateral sides 16' on the clamp underlie the arms 21 of the bracket and limit the hinge movement thereof. The bracket 20 has laterally extending branches 23 oppositely disposed that terminate with upwardly inclined extensions 24 with inturned ends 25.

A fish bait receptacle is provided consisting of two similar trays 26 and 27 that are hingedly connected to each other, said trays having ears 28 extending outwardly from the adjacent sides thereof at their ends. The ears are perforated and overlap each other correspondingly and are secured together by hollow pintles 29 disposed through the perforations in the ears. The trays are thus hingedly connected so that either of said trays may be swung over onto the other and function as a cover therefor and in this manner form a closed receptacle. A spring latch 30 on one of said trays 27 has locking engagement with the other tray 26 for securing said trays together when in closed position. Preferably, there are made in the wall of each tray vent openings 31 to afford drainage and ventilation.

The bait receptacle is detachably secured to the bracket and has hinge movement thereon, connections being made by springing the extensions 24 laterally outward and inserting the inturned ends 25 inwardly through the corresponding hollow pintles 29, thus affording hinged support for the receptacle. By this arrangement the receptacle is movable into selected positions by turning it upon its hinge supports. When in its innermost extended position the receptacle rests upon the branches 23 by which its hinge movement is limited in one direction, and is similarly limited when moved to another position, as indicated by the dotted lines 26'—27', by having contact with the clamp.

One of the features of the invention is the provision for the hinge movement of the bracket 20 on the clamp to its outermost extended position so the receptacle is moved into and suspended within the sack as indicated by the dotted lines 27''—26''.

The trays 26 and 27 forming the bait receptacle preferably are shaped so their end and side walls slant outwardly thus to facilitate removal of their contents, such as earthen matter in which bait was imbedded, especially after becoming dried. The back walls of the trays are made flat so that when the trays are spread into open position on a flat support, such as a boat seat (not shown), rolling of the receptacle is prevented.

In use, the clamp is placed astride the support 10 and secured thereon by manipulating the clamp screw 8. The frame 12 together with the sack is then swung to outboard position and the bracket 20 is swung to its innermost position. The receptacle is then secured to the bracket so as to have hinge movement on the inturned ends 25 thereof. While the receptacle is thus supported, it may be readily swung bodily while closed, from its innermost extended position to an intermediate position, or vice versa. This affords convenience in removing bait from earthen matter contained in the trays. Ordinarily, bait, such as worms, gather at the bottom of the earthen content and are more or less inaccessible because of the overlying earthen matter. Upon shifting the receptacle from its innermost extended position to its intermediate position, or vice versa, the trays and the content of the receptacle become inverted, thus upon opening the receptacle the bait lies exposed at the top of the earthen matter and is readily accessible for removal. When the receptacle is in either of its positions and opened, the trays are spread out so that the exposed bait in one of the trays may be removed and placed conveniently in the other tray for ready use.

Another feature of the invention is the arrangement wherein by swinging the bracket upon its hinged support together with the receptacle while attached thereto so as to overhang the sack, the receptacle, while closed, then is suspended in the upper portion of the sack so that the apparatus in compact arrangement may readily be removed from the gunwale and carried bodily away.

Variations from the particular construction above disclosed may be resorted to by the exercise of skill in the art, without departure from the scope of the invention, and the following claims are intended to be inclusive of such variations.

What I claim is:

1. In an equipage for fishermen, a combined fish sack and bait can holder consisting of a clamp adapted to be detachably secured on a support, said clamp having laterally extending sides, a frame hingedly secured to said clamp, movement thereof being limited by said sides, a sack secured pendently to said frame, a bracket hingedly secured to said clamp having movement thereon limited by said sides provided with divergent branches having inturned ends, and a bait receptacle constituted of two trays hingedly connected together, the hinges for which have hollow pintles in which said inturned ends extend, wherefore said receptacle is hingedly supported on the bracket, the arrangement being such that said receptacle is movable into and supported in selected positions when said bracket is disposed in its innermost position, or into said sack when said bracket is swung into its outboard position.

2. In an equipage for fishermen, a combined fish sack and bait can holder consisting of a clamp adapted to be detachably secured on a support, a fish sack provided with a supporting frame secured to said clamp for limited hinged movement thereon, a bracket secured to said clamp for limited hinged movement thereon provided with branches with inturned ends, and a bait receptacle having hinged tray members, the hinges for said trays having hollow pintles in which said ends extend wherefore to hingedly support said receptacle on the bracket to permit movement of the receptacle into selected positions when said bracket is disposed in its innermost position, or into said sack when said bracket is swung into its outboard position.

3. An equipage for fishermen consisting of a supporting clamp, a fish sack provided with a swinging frame secured to said clamp, a swinging bracket secured to said clamp, means in connection with the clamp to limit movement of said frame and bracket relative thereto, a pair of trays hingedly connected together constituting a bait receptacle, said receptacle having hinged support on said bracket, the arrangement being such as to permit opening and closing of said receptacle while supported on said bracket, or movement of the receptacle into selected positions when said bracket is disposed in its innermost position or into the sack when in its opposite position.

4. In an equipage for fishermen, the combination of a supporting clamp, a frame and a bracket mounted on said clamp having independent swinging movement thereon, a fish sack supported by said frame, and a bait receptacle having tray members hingedly connected together and hingedly supported on said bracket, the arrangement being such as to permit movement of said receptacle into selected positions by turning the receptacle on its hinged connection with said bracket or into said sack by swinging movement of said bracket.

5. An equipage for fishermen consisting of a supporting clamp, a bracket hingedly mounted at one end thereof on said clamp, and a bait receptacle hingedly mounted on the other end of said bracket having tray members hingedly connected together to permit opening and closing of said receptacle while thus mounted, the arrangement being such as to permit movement of said receptacle selectively from one position to another by turning of the receptacle bodily on its hinged connection with the bracket or by swinging movement of said bracket from one position to another.

6. A fisherman's equipage consisting of a supporting clamp, a bait receptacle constituted of two tray members provided with hinges connecting said trays together, the pintles of said hinges being hollow, and a bracket hingedly connected at one end thereof to said clamp provided with inturned members extending into said hollow pintles hingedly supporting said receptacle, the arrangement being such as to permit inversion of the receptacle by turning from one position to another on said members or to move said receptacle from one selected position to another by swinging movement of said bracket upon its hinged connection with said clamp.

7. A bait receptacle and support therefor, said receptacle having two tray members provided with hinges connecting the trays together, said support consisting of a bracket provided at one end with a mount hinged thereto and having at its opposite end portion supporting connection with the hinges on said receptacle, the arrangement being such as to permit movement of the receptacle bodily from one selected position to another by swinging movement of said bracket or by turning of said receptacle upon its hinged connection with said bracket from one position to another, and permit opening or closing of the receptacle by movement of one of said trays relative to the other upon their hinged connections while the receptacle is in any of its selected positions.

8. A bait receptacle and support therefor, said receptacle having two trays hingedly connected together, said support consisting of a mount and a bracket having at one end thereof hinged connection with said mount and at its opposite end portion hinged connection with said receptacle, so that said receptacle is movable into various selected positions by turning the receptacle upon its hinged connection with the bracket or swinging the bracket upon its hinged connection with said mount.

9. A bait receptacle and support therefor consisting of a swinging bracket provided at one end thereof with a hingedly connected mount, and two trays having hinged connection with each other and with the other end portion of said bracket constituting a bait receptacle, the arrangement being such as to permit opening of the receptacle by turning said trays upon their hinges, inversion of the receptacle by turning the receptacle bodily upon its hinged connection with said bracket from one selected position to another, and movement of said receptacle into a farther extended position by swinging said bracket on its mount from one selected position to another.

10. A bait receptacle and support therefor, said receptacle having two trays provided with hinges connecting said trays together, the pintles of said hinges being hollow and the support for said receptacle being provided with members extending into said hollow pintles, the arrangement being such as to permit inversion of said receptacle by movement thereof bodily from one selected position to another about the axes of said members, or opening of said receptacle when in either position by turning the uppermost one of said trays upon its hinged connection with the other tray.

11. A bait receptacle consisting of two like trays, hinges connecting said trays in opposing positions having hollow pintles, and means provided with members extending into said pintles to hingedly support said receptacle, the arrangement being such as to permit the receptacle when closed to be turned upon said members bodily from one position to another, and said trays being selectively movable upon their hinged connections over onto the other tray to function as a cover therefor and close the receptacle.

EDWARD H. KRUSE.